(12) United States Patent
Wolrich et al.

(10) Patent No.: US 7,421,572 B1
(45) Date of Patent: Sep. 2, 2008

(54) BRANCH INSTRUCTION FOR PROCESSOR WITH BRANCHING DEPENDENT ON A SPECIFIED BIT IN A REGISTER

(75) Inventors: Gilbert Wolrich, Framingham, MA (US); Matthew J. Adiletta, Worcester, MA (US); William R. Wheeler, Southborough, MA (US); Debra Bernstein, Sudbury, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 10/069,195

(22) PCT Filed: Aug. 31, 2000

(86) PCT No.: PCT/US00/23994

§ 371 (c)(1),
(2), (4) Date: Nov. 7, 2002

(87) PCT Pub. No.: WO01/16722

PCT Pub. Date: Mar. 8, 2001

(51) Int. Cl.
*G06F 9/32* (2006.01)

(52) U.S. Cl. .................. 712/234; 712/235; 712/237; 712/239

(58) Field of Classification Search ............... 712/234, 712/235, 237, 239
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,577,189 A * | 5/1971 | Cocke et al. | ............... 712/219 |
| 3,792,441 A | 2/1974 | Wymore et al. | |
| 3,881,173 A | 4/1975 | Larsen et al. | |
| 3,913,074 A | 10/1975 | Homberg et al. | |
| 3,940,745 A | 2/1976 | Sajeva | |
| 4,023,023 A | 5/1977 | Bourrez et al. | |
| 4,130,890 A | 12/1978 | Adam | |
| 4,392,758 A | 7/1983 | Bowles et al. | |
| 4,400,770 A | 8/1983 | Chan et al. | |
| 4,454,595 A | 6/1984 | Cage | |
| 4,471,426 A * | 9/1984 | McDonough | ............... 712/211 |
| 4,477,872 A | 10/1984 | Losq et al. | |

(Continued)

FOREIGN PATENT DOCUMENTS

EP 0 130 381 1/1985

(Continued)

OTHER PUBLICATIONS

Kane, Gerry; PA-RiSC 2.0 Architecture; 1995; Prentice Hall PTR.*

(Continued)

*Primary Examiner*—Tonia L. M. Dollinger
(74) *Attorney, Agent, or Firm*—Fish & Richardson P.C.

(57) ABSTRACT

A processor such as a parallel hardware-based multithreaded processor (12) is described. The processor (12) can execute a computer instruction that is a branch instruction that causes an instruction sequence in the processor to branch on any specified bit of a register (80, 78, 76*b*) being set or cleared and which specifies which bit of the specified register to use as a branch control bit.

31 Claims, 7 Drawing Sheets

```
          31 30 29 28 27 26 25 24 23 22 21 20 19 18 17 16 15 14 13 12 11 10 9 8 7 6 5 4 3 2 1 0
BR_BIT   +--+--+--+--+--+--+--+--+--+--+--+--+--+--+--+--+--+--+--+--+--+--+--+--+--+--+--+--+--+--+--+--+
B        | 1| 1| 1| 1|  shft|A/B Rel Src(aluB) | amount |Bv|    Branch Address      | defbr |GT| branch bit |pass
(set cc) +--+--+--+--+--+--+--+--+--+--+--+--+--+--+--+--+--+--+--+--+--+--+--+--+--+--+--+--+--+--+--+--+
```

Branch Descriptions:
  Defbr => gives number of defered instructions (must be less/equal max_allowed (or BR_ev field))
  Defered instructions can NOT be branch instructions
  Br_Byte => (EQ assumes GT, NEQ assumes NT)
  Can have defer = 3 on conditional branchs following br-bit or br-byte

U.S. PATENT DOCUMENTS

| | | |
|---|---|---|
| 4,514,807 A | 4/1985 | Nogi |
| 4,523,272 A | 6/1985 | Fukunaga et al. |
| 4,569,016 A | 2/1986 | Hao et al. |
| 4,606,025 A | 8/1986 | Peters et al. |
| 4,724,521 A | 2/1988 | Carron et al. |
| 4,742,451 A | 5/1988 | Bruckert et al. |
| 4,745,544 A | 5/1988 | Renner et al. |
| 4,755,966 A | 7/1988 | Lee et al. |
| 4,777,587 A | 10/1988 | Case et al. |
| 4,808,988 A | 2/1989 | Burke et al. |
| 4,816,913 A | 3/1989 | Harney et al. |
| 4,847,755 A | 7/1989 | Morrison et al. |
| 4,866,664 A | 9/1989 | Burkhardt, Jr. et al. |
| 4,868,735 A | 9/1989 | Moller et al. |
| 4,992,934 A | 2/1991 | Portanova et al. |
| 5,045,995 A | 9/1991 | Levinthal et al. |
| 5,056,015 A | 10/1991 | Baldwin et al. |
| 5,073,864 A | 12/1991 | Methvin et al. |
| 5,113,516 A | 5/1992 | Johnson |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,165,025 A | 11/1992 | Lass |
| 5,168,555 A | 12/1992 | Byers et al. |
| 5,170,484 A | 12/1992 | Grondalski |
| 5,173,897 A | 12/1992 | Schrodi et al. |
| 5,187,800 A | 2/1993 | Sutherland |
| 5,189,636 A | 2/1993 | Patti et al. |
| 5,202,972 A | 4/1993 | Gusefski et al. |
| 5,220,669 A | 6/1993 | Baum et al. |
| 5,247,671 A | 9/1993 | Adkins et al. |
| 5,255,239 A | 10/1993 | Taborn et al. |
| 5,263,169 A | 11/1993 | Genusov et al. |
| 5,274,770 A | 12/1993 | Khim Yeoh et al. |
| 5,347,648 A | 9/1994 | Stamm et al. |
| 5,357,617 A | 10/1994 | Davis et al. |
| 5,363,448 A | 11/1994 | Koopman, Jr. et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,394,530 A | 2/1995 | Kitta |
| 5,404,464 A | 4/1995 | Bennett |
| 5,404,482 A | 4/1995 | Stamm et al. |
| 5,428,779 A | 6/1995 | Allegrucci et al. |
| 5,428,809 A | 6/1995 | Coffin et al. |
| 5,432,918 A | 7/1995 | Stamm |
| 5,436,626 A | 7/1995 | Fujiwara |
| 5,442,756 A * | 8/1995 | Grochowski et al. ........ 712/238 |
| 5,448,702 A | 9/1995 | Garcia, Jr. et al. |
| 5,450,351 A | 9/1995 | Heddes |
| 5,450,603 A | 9/1995 | Davies |
| 5,452,437 A | 9/1995 | Richey et al. |
| 5,459,842 A | 10/1995 | Begun et al. |
| 5,463,625 A | 10/1995 | Yasrebi |
| 5,463,746 A | 10/1995 | Brodnax et al. |
| 5,467,452 A | 11/1995 | Blum et al. |
| 5,481,683 A | 1/1996 | Karim |
| 5,487,159 A | 1/1996 | Byers et al. |
| 5,509,130 A | 4/1996 | Trauben et al. |
| 5,517,628 A | 5/1996 | Morrison et al. |
| 5,517,648 A | 5/1996 | Bertone et al. |
| 5,541,920 A | 7/1996 | Angle et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,544,337 A | 8/1996 | Beard et al. |
| 5,550,816 A | 8/1996 | Hardwick et al. |
| 5,557,766 A | 9/1996 | Takiguchi et al. |
| 5,568,617 A | 10/1996 | Kametani |
| 5,572,690 A | 11/1996 | Molnar et al. |
| 5,574,922 A | 11/1996 | James |
| 5,574,939 A | 11/1996 | Keckler et al. |
| 5,592,622 A | 1/1997 | Isfeld et al. |
| 5,600,812 A | 2/1997 | Park |
| 5,600,848 A | 2/1997 | Sproull et al. |
| 5,606,676 A | 2/1997 | Grochowski et al. |
| 5,610,864 A | 3/1997 | Manning |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,640,538 A | 6/1997 | Dyer et al. |
| 5,644,623 A | 7/1997 | Gulledge |
| 5,649,157 A | 7/1997 | Williams |
| 5,652,583 A | 7/1997 | Kang |
| 5,659,687 A | 8/1997 | Kim et al. |
| 5,659,722 A | 8/1997 | Blaner et al. |
| 5,669,012 A | 9/1997 | Shimizu et al. |
| 5,680,564 A | 10/1997 | Divivier et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,701,435 A | 12/1997 | Chi |
| 5,704,054 A | 12/1997 | Bhattacharya |
| 5,717,760 A | 2/1998 | Satterfield |
| 5,717,898 A | 2/1998 | Kagan et al. |
| 5,721,869 A | 2/1998 | Imakawa |
| 5,721,870 A | 2/1998 | Matsumoto |
| 5,724,563 A | 3/1998 | Hasegawa |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,748,950 A | 5/1998 | White et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,787,454 A | 7/1998 | Rohlman |
| 5,796,413 A | 8/1998 | Shipp et al. |
| 5,797,043 A | 8/1998 | Lewis et al. |
| 5,802,373 A | 9/1998 | Yates et al. |
| 5,809,235 A | 9/1998 | Sharma et al. |
| 5,809,530 A | 9/1998 | Samra et al. |
| 5,812,811 A | 9/1998 | Dubey et al. |
| 5,812,839 A | 9/1998 | Hoyt et al. |
| 5,812,868 A | 9/1998 | Moyer et al. |
| 5,815,698 A | 9/1998 | Holmann et al. |
| 5,815,714 A | 9/1998 | Shridhar et al. |
| 5,819,080 A | 10/1998 | Dutton et al. |
| 5,822,619 A | 10/1998 | Sidwell |
| 5,828,746 A | 10/1998 | Ardon |
| 5,828,863 A | 10/1998 | Barrett et al. |
| 5,832,215 A | 11/1998 | Kato et al. |
| 5,832,258 A | 11/1998 | Kiuchi et al. |
| 5,835,755 A | 11/1998 | Stellwagen, Jr. |
| 5,838,975 A | 11/1998 | Abramson et al. |
| 5,848,276 A | 12/1998 | King et al. |
| 5,854,922 A | 12/1998 | Gravenstein et al. |
| 5,857,104 A | 1/1999 | Natarjan et al. |
| 5,859,789 A | 1/1999 | Sidwell |
| 5,859,790 A | 1/1999 | Sidwell |
| 5,860,085 A | 1/1999 | Stormon et al. |
| 5,860,158 A | 1/1999 | Pai et al. |
| 5,870,597 A | 2/1999 | Panwar et al. |
| 5,872,963 A | 2/1999 | Bitar et al. |
| 5,875,355 A | 2/1999 | Sidwell et al. |

| | | | | | | |
|---|---|---|---|---|---|---|
| 5,875,470 A | 2/1999 | Dreibelbis et al. | | 6,157,955 A | 12/2000 | Narad et al. |
| 5,884,069 A | 3/1999 | Sidwell | | 6,157,988 A | 12/2000 | Dowling |
| 5,886,992 A | 3/1999 | Raatikainen et al. | | 6,160,562 A | 12/2000 | Chin et al. |
| 5,887,134 A | 3/1999 | Ebrahim | | 6,182,177 B1 | 1/2001 | Harriman |
| 5,890,208 A | 3/1999 | Kwon | | 6,195,676 B1 | 2/2001 | Spix et al. |
| 5,892,979 A | 4/1999 | Shiraki et al. | | 6,195,739 B1 | 2/2001 | Wright et al. |
| 5,898,866 A | 4/1999 | Atkins et al. | | 6,199,133 B1 | 3/2001 | Schnell |
| 5,900,025 A | 5/1999 | Sollars | | 6,201,807 B1 | 3/2001 | Prasanna |
| 5,905,876 A | 5/1999 | Pawlowski et al. | | 6,205,468 B1 | 3/2001 | Diepstraten et al. |
| 5,905,889 A | 5/1999 | Wilhelm, Jr. | | 6,212,542 B1 | 4/2001 | Kahle et al. |
| 5,915,123 A | 6/1999 | Mirsky et al. | | 6,212,611 B1 | 4/2001 | Nizar et al. |
| 5,923,872 A | 7/1999 | Chrysos et al. | | 6,216,220 B1 | 4/2001 | Hwang |
| 5,926,646 A | 7/1999 | Pickett et al. | | 6,223,207 B1 | 4/2001 | Lucovsky et al. |
| 5,928,358 A | 7/1999 | Takayama et al. | | 6,223,208 B1 | 4/2001 | Kiefer et al. |
| 5,933,627 A | 8/1999 | Parady | | 6,223,238 B1 | 4/2001 | Meyer et al. |
| 5,937,177 A | 8/1999 | Molnar et al. | | 6,223,277 B1 | 4/2001 | Karguth |
| 5,937,187 A | 8/1999 | Kosche et al. | | 6,223,279 B1 | 4/2001 | Nishimura et al. |
| 5,938,736 A | 8/1999 | Muller et al. | | 6,230,119 B1 | 5/2001 | Mitchell |
| 5,940,612 A | 8/1999 | Brady et al. | | 6,230,230 B1 | 5/2001 | Joy et al. |
| 5,940,866 A | 8/1999 | Chisholm et al. | | 6,230,261 B1 | 5/2001 | Henry et al. |
| 5,943,491 A | 8/1999 | Sutherland et al. | | 6,247,025 B1 | 6/2001 | Bacon |
| 5,944,816 A | 8/1999 | Dutton et al. | | 6,256,713 B1 | 7/2001 | Audityan et al. |
| 5,946,222 A | 8/1999 | Redford | | 6,259,699 B1 | 7/2001 | Opalka et al. |
| 5,946,487 A | 8/1999 | Dangelo | | 6,269,391 B1 | 7/2001 | Gillespie |
| 5,948,081 A | 9/1999 | Foster | | 6,272,616 B1 | 8/2001 | Fernando et al. |
| 5,951,679 A | 9/1999 | Anderson et al. | | 6,275,505 B1 | 8/2001 | O Loughlin et al. |
| 5,956,514 A | 9/1999 | Wen et al. | | 6,275,508 B1 | 8/2001 | Aggarwal et al. |
| 5,958,031 A | 9/1999 | Kim | | 6,279,066 B1 | 8/2001 | Velingker |
| 5,961,628 A | 10/1999 | Nguyen et al. | | 6,279,113 B1 | 8/2001 | Vaidya |
| 5,970,013 A | 10/1999 | Fischer et al. | | 6,289,011 B1 | 9/2001 | Seo et al. |
| 5,978,838 A | 11/1999 | Mohamed et al. | | 6,298,370 B1 | 10/2001 | Tang et al. |
| 5,983,274 A | 11/1999 | Hyder et al. | | 6,304,956 B1 | 10/2001 | Tran |
| 5,993,627 A | 11/1999 | Anderson et al. | | 6,307,789 B1 | 10/2001 | Wolrich et al. |
| 5,996,068 A | 11/1999 | Dwyer, III et al. | | 6,314,510 B1 | 11/2001 | Saulsbury et al. |
| 6,002,881 A | 12/1999 | York et al. | | 6,324,624 B1 | 11/2001 | Wolrich et al. |
| 6,005,575 A | 12/1999 | Colleran et al. | | 6,338,133 B1 | 1/2002 | Schroter |
| 6,009,505 A | 12/1999 | Thayer et al. | | 6,345,334 B1 | 2/2002 | Nakagawa et al. |
| 6,009,515 A | 12/1999 | Steele, Jr. | | 6,347,344 B1 | 2/2002 | Baker et al. |
| 6,012,151 A | 1/2000 | Mano | | 6,351,808 B1 | 2/2002 | Joy et al. |
| 6,014,729 A | 1/2000 | Lannan et al. | | 6,356,962 B1 | 3/2002 | Kasper et al. |
| 6,023,742 A | 2/2000 | Ebeling et al. | | 6,360,262 B1 | 3/2002 | Guenthner et al. |
| 6,029,228 A | 2/2000 | Cai et al. | | 6,373,848 B1 | 4/2002 | Allison et al. |
| 6,052,769 A | 4/2000 | Huff et al. | | 6,378,124 B1 | 4/2002 | Bates et al. |
| 6,058,168 A | 5/2000 | Braband | | 6,378,125 B1 | 4/2002 | Bates et al. |
| 6,058,465 A | 5/2000 | Nguyen | | 6,385,720 B1 * | 5/2002 | Tanaka et al. ............... 712/240 |
| 6,061,710 A | 5/2000 | Eickemeyer et al. | | 6,389,449 B1 | 5/2002 | Nemirovsky et al. |
| 6,061,711 A | 5/2000 | Song et al. | | 6,393,483 B1 | 5/2002 | Latif et al. |
| 6,067,585 A | 5/2000 | Hoang | | 6,401,155 B1 | 6/2002 | Saville et al. |
| 6,070,231 A | 5/2000 | Ottinger | | 6,408,325 B1 | 6/2002 | Shaylor |
| 6,072,781 A | 6/2000 | Feeney et al. | | 6,415,338 B1 | 7/2002 | Habot |
| 6,073,215 A | 6/2000 | Snyder | | 6,426,940 B1 | 7/2002 | Seo et al. |
| 6,076,158 A | 6/2000 | Sites et al. | | 6,427,196 B1 | 7/2002 | Adiletta et al. |
| 6,079,008 A | 6/2000 | Clery, III | | 6,430,626 B1 | 8/2002 | Witkowski et al. |
| 6,079,014 A | 6/2000 | Papworth et al. | | 6,434,145 B1 | 8/2002 | Opsasnick et al. |
| 6,085,215 A | 7/2000 | Ramakrishnan et al. | | 6,442,669 B2 | 8/2002 | Wright et al. |
| 6,085,294 A | 7/2000 | Van Doren et al. | | 6,446,190 B1 | 9/2002 | Barry et al. |
| 6,092,127 A | 7/2000 | Tausheck | | 6,463,072 B1 | 10/2002 | Wolrich et al. |
| 6,092,158 A | 7/2000 | Harriman et al. | | 6,496,847 B1 | 12/2002 | Bugnion et al. |
| 6,092,175 A | 7/2000 | Levy et al. | | 6,505,229 B1 | 1/2003 | Turner et al. |
| 6,100,905 A | 8/2000 | Sidwell | | 6,523,108 B1 | 2/2003 | James et al. |
| 6,101,599 A | 8/2000 | Wright et al. | | 6,532,509 B1 | 3/2003 | Wolrich et al. |
| 6,112,016 A | 8/2000 | MacWilliams et al. | | 6,543,049 B1 | 4/2003 | Bates et al. |
| 6,115,777 A | 9/2000 | Zahir et al. | | 6,552,826 B2 | 4/2003 | Adler et al. |
| 6,115,811 A | 9/2000 | Steele, Jr. | | 6,560,629 B1 | 5/2003 | Harris |
| 6,134,665 A | 10/2000 | Klein et al. | | 6,560,667 B1 | 5/2003 | Wolrich et al. |
| 6,139,199 A | 10/2000 | Rodriguez | | 6,560,671 B1 | 5/2003 | Samra et al. |
| 6,141,123 A | 10/2000 | Nakashima et al. | | 6,564,316 B1 | 5/2003 | Perets et al. |
| 6,141,348 A | 10/2000 | Muntz | | 6,574,702 B2 | 6/2003 | Khanna et al. |
| 6,141,689 A | 10/2000 | Yasrebi | | 6,577,542 B2 | 6/2003 | Wolrich et al. |
| 6,141,765 A | 10/2000 | Sherman | | 6,584,522 B1 | 6/2003 | Wolrich et al. |
| 6,144,669 A | 11/2000 | Williams et al. | | 6,587,906 B2 | 7/2003 | Wolrich et al. |
| 6,145,054 A | 11/2000 | Mehrotra et al. | | 6,606,704 B1 | 8/2003 | Adiletta et al. |
| 6,145,077 A | 11/2000 | Sidwell et al. | | 6,625,654 B1 | 9/2003 | Wolrich et al. |

| | | |
|---|---|---|
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,681,300 B2 | 1/2004 | Wolrich et al. |
| 6,694,380 B1 | 2/2004 | Wolrich et al. |
| 6,697,935 B1 | 2/2004 | Borkenhagen et al. |
| 6,718,457 B2 | 4/2004 | Tremblay et al. |
| 6,784,889 B1 | 8/2004 | Radke |
| 6,836,838 B1 | 12/2004 | Wright et al. |
| 6,862,676 B1 | 3/2005 | Knapp et al. |
| 6,934,951 B2 | 8/2005 | Wilkinson, III et al. |
| 6,971,103 B2 | 11/2005 | Hokenek et al. |
| 6,976,095 B1 | 12/2005 | Wolrich et al. |
| 6,983,350 B1 | 1/2006 | Adiletta et al. |
| 7,020,871 B2 | 3/2006 | Bernstein et al. |
| 7,181,594 B2 | 2/2007 | Wilkinson, III et al. |
| 7,185,224 B1 | 2/2007 | Fredenburg et al. |
| 7,191,309 B1 | 3/2007 | Wolrich et al. |
| 7,302,549 B2 | 11/2007 | Wilkinson, III et al. |
| 2002/0038403 A1 | 3/2002 | Wolrich et al. |
| 2002/0053017 A1 | 5/2002 | Adiletta et al. |
| 2002/0056037 A1 | 5/2002 | Wolrich et al. |
| 2003/0041228 A1 | 2/2003 | Rosenbluth et al. |
| 2003/0145159 A1 | 7/2003 | Adiletta et al. |
| 2003/0191866 A1 | 10/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0205747 A1 | 10/2004 | Bernstein et al. |
| 2007/0234009 A1 | 10/2007 | Wolrich et al. |

FOREIGN PATENT DOCUMENTS

| | | |
|---|---|---|
| EP | 0 379 709 | 8/1990 |
| EP | 0 463 855 | 1/1992 |
| EP | 0 464 715 | 1/1992 |
| EP | 0 476 628 | 3/1992 |
| EP | 0 633 678 | 1/1995 |
| EP | 0 696 772 | 2/1996 |
| EP | 0 745 933 | 12/1996 |
| EP | 0 809 180 | 11/1997 |
| JP | 59-111533 | 6/1984 |
| WO | WO94/15287 | 7/1994 |
| WO | WO97/38372 | 10/1997 |
| WO | WO 01/15718 | 3/2001 |
| WO | WO 01/16697 | 3/2001 |
| WO | WO 01/16698 | 3/2001 |
| WO | WO 01/16702 | 3/2001 |
| WO | WO 01/16703 | 3/2001 |
| WO | WO 01/16713 | 3/2001 |
| WO | WO 01/16714 | 3/2001 |
| WO | WO 01/16715 | 3/2001 |
| WO | WO 01/16716 | 3/2001 |
| WO | WO 01/16718 | 3/2001 |
| WO | WO 01/16758 | 3/2001 |
| WO | WO 01/16769 | 3/2001 |
| WO | WO 01/16770 | 3/2001 |
| WO | WO 01/16782 | 3/2001 |
| WO | WO 01/18646 | 3/2001 |
| WO | WO 01/41530 | 6/2001 |
| WO | WO 01/48596 | 7/2001 |
| WO | WO 01/48599 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/019399 | 3/2003 |
| WO | WO03/085517 | 10/2003 |

OTHER PUBLICATIONS

U.S. Appl. No. 09/473,571, filed Dec. 28, 1999, Wolrich et al.

U.S. Appl. No. 09/475,614, filed Dec. 30, 1999, Wolrich et al.

Agarwal et al., "April: A Processor Architecture for Multiprocessing," Proceedings of the 17th Annual International Symposium on Computer Architecutre, IEEE, pp. 104-114.

Byrd et al., "Multithread Processor Architectures," *IEEE Spectrum*, vol. 32, No. 8, New York, Aug. 1, 1995, pp. 38-46.

Chang et al., "A New Mechanism For Improving Branch Predictor Performance," IEEE, pp. 22-31 (1994).

Doyle et al., *Microsoft Press Computer Dictionary*, 2nd ed., Microsoft Press, Redmond, Washington, USA, 1994, p. 326.

Farkas et al., "The multicluster architecture: reducing cycle time through partitioning," IEEE, vol. 30, Dec. 1997, pp. 149-159.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hennessy et al., "Computer Organization and Design: The Hardware/Software Interface," Morgan Kaufman Publishers, pp. 476-482 (1998).

Hyde, R., "Overview of Memory Management," *Byte*, vol. 13, No. 4, 1998, pp. 219-225.

Intel, "IA-64 Application Developer's Architecture Guide," Rev.1.0, May 1999, pp. 2-2, 4-29 to 4-31, 7-116 to 7-118 and c-21.

Keckler et al., "Exploiting fine grain thread level parallelism on the MIT multi-ALU processor," IEEE, Jun. 1998.

Litch et al., "StrongARMing Portable Communications," IEEE Micro, 1998, pp. 48-55.

Mendelson et al., "Design Alternatives of Multithreaded Architecture," *International Journal of Parallel Programming*, vol. 27, No. 3, Plenum Press, New York, USA, Jun. 1999, pp. 161-193.

Paver et al., "Register Locking in Asynchronous Processor Computer Design: VLSI Processors," ICCD '92 Proceedings, IEEE 1992 International Conference, 1992, pp. 385-398.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wadler, "The Concatenate Vanishes," University of Glasgow, Dec. 1987 (revised Nov. 1989), pp. 1-7.

Waldspurger et al., "Register Relocation: Flexible Contents for Multithreading," Proceedings of the 20th Annual International Symposium on Computer Architecture, 1993, pp. 120-130.

Wazlowski et al., "PRSIM-II computer and architecture," IEEE Proceedings, Workshop on FPGAs for Custom Computing Machines, 1993.

"Hart, Field Communications Protocol, Application Guide", Hart Communication Foundation, pp. 1-74, (1999).

Bowden, Romilly, "What is Hart?" Romilly's HART® and Fieldbus Web Site, 3 pages, (1997).

Cheng et al., "The Computer for Supporting Multithreading in Cyclic Register Windows", *IEEE*, pp. 57-62, (1996).

Hennessy et al., *Computer Organization and Design: The Hardware/Software Interface*, Morgan Kaufman Publishers, pp. 116-119, 181-182, 225-227, 447-449, 466-470, 476-482, 510-519, 712, (1998).

Heuring et al., *Computer Systems Design and Architecture*, Reading MA, Addison Wesley Longman, Inc., pp. 174-176 and 200, (1997).

Heuring et al., *Computer Systems Design and Architecture*, Reading MA, Addison Wesley Longman, Inc., pp. 38-40, 143-171, and 285-288, (1997).

Hidaka, Y., et al., "Multiple Threads in Cyclic Register Windows", *Computer Architecture News*, ACM, New York, NY, USA, 21(2):131-142, May 1993.

Hirata, H., et al., "An Elementary Processor Architecture with Simultaneous Instruction Issuing from Multiple Threads", *Proc. 19th Annual International Symposium on Computer Architecture, ACM & IEEE-CS*, 20(2):136-145, May 1992.

Intel, "1A-94 Application Developer's Architecture Guide," Rev. 1.0 , pp. 2-2, 2-3, 3-1, 7-165, C-4, and C-23, May 1999.

Jung, G., et al., "Flexible Register Window Structure for Multi-Tasking", *Proc. 24th Annual Hawaii International Conference on System Sciences*, vol. 1, pp. 110-116, (1991).

Koch, G., et al., "Breakpoints and Breakpoint Detection in Source Level Emulation", *Proc. 19th Annual International Symposium on System Synthesis (ISSS '96), IEEE*, pp. 26-31, (1996).

Moors, et al., "Cascading Content-Addressable Memories", *IEEE Micro*, 12(3):56-66 (1992)..

Okamoto, K., et al., "Multithread Execution Mechanism on RICA-1 for Massively Parallel Computation", *IEEE - Proc. of PACT '96*, pp. 116-121, (1996).

Patterson, et al., *Computer Architecture a Quantitative Approach*, 2nd Ed., Morgan Kaufmann Publishers, pp. 447-449, (1996).

Paver, et al., "Register Locking in an Asynchronous Microporcessor", *IEEE* , pp. 351-355, (1992).

Philips ED - Philips Components: "8051 Based 8 Bit Microcontrollers, Data Handbook Integrated Circuits, Book IC20", 8051 Based 8 Bit Microcontrollers, Eindhoven, Philips, NL, pp. 5-19 (1991).

Probst, et al., "Programming Compiling and Executing Partially-Ordered Instruction Streams on Scalable Shared-Memory Multiprocessors", *Proceedings of the 27th Annual Hawaii International Conference on System Sciences, IEEE*, pp. 584-593, (1994).

Quammen D., et al., "Flexible Register Management for Sequential Programs", *IEEE Proc. of the Annual International Symposium on Computer Architecture*, Toronto, May 27-30, 1991, vol. SYMP. 18, pp. 320-329.

Ramsey, N., "Correctness of Trap-Based Breakpoint Implementations", *Proc. of the 21st ACM Symposium on the Principles of Programming Languages*, pp. 15-24, (1994).

Steven, G.B., et al., "ALU design and processor branch architecture", *IMicroprocessing and Microprogramming*, 36(5):259-278, Oct. 1993.

Young, H.C., "Code Scheduling Methods for Some Architectural Features in Pipi", *IMicroprocessing and Microprogramming*, Elsevier Science Publishers, Amsterdam, NL,22(1):39-63, Jan. 1998.

Young, H.C., "On Instruction and Data Prefetch Mechanisms", *International Symposium on VLSI Technology, Systems and Applications, Proc. of Technical Papers*, pp. 239-246, (1995).

Heuring et al., *Computer Systems and Design and Architecture*, Reading, MA, Addison Wesley Longman, Inc., pp. 69-71, (1997).

* cited by examiner

```
         3 3 2 2 2 2 2 2 2 2 2 2 1 1 1 1 1 1 1 1 1 1
         1 0 9 8 7 6 5 4 3 2 1 0 9 8 7 6 5 4 3 2 1 0 9 8 7 6 5 4 3 2 1 0
        +--+--+--+--+--+--+--+--+--+--+--+--+--+--+--+--+--+--+--+--+--+--+--+--+--+--+--+--+--+--+--+--+
BR_BIT  |1 |1 |1 |1 |  shft|A/B| Rel Src(aluB)| amount  |Bv|   Branch Address    |defbr |GT| branch bit |pass
B       +--+--+--+--+--+--+--+--+--+--+--+--+--+--+--+--+--+--+--+--+--+--+--+--+--+--+--+--+--+--+--+--+
(set cc)
```

Branch Descriptions:

Defbr => gives number of defered instructions (must be less/equal max_allowed (or BR_ev field))
  Defered instructions can NOT be branch instructions
  Br_Byte => (EQ assumes GT, NEQ assumes NT)
  Can have defer = 3 on conditional branchs following br-bit or br-byte

FIG. 5

BRANCH INSTRUCTION FOR PROCESSOR WITH BRANCHING DEPENDENT ON A SPECIFIED BIT IN A REGISTER

BACKGROUND

This invention relates to branch instructions.

Parallel processing is an efficient form of information processing of concurrent events in a computing process. Parallel processing demands concurrent execution of many programs in a computer. Sequential processing or serial processing has all tasks performed sequentially at a single station whereas, pipelined processing has tasks performed at specialized stations. Computer code whether executed in parallel processing, pipelined or sequential processing machines involves branches in which an instruction stream may execute in a sequence and branch from the sequence to a different sequence of instructions.

BRIEF DESCRIPTION OF THE DRAWINGS

FIG. 5 shows exemplary formats for branch instructions.

DESCRIPTION

Figure 1:
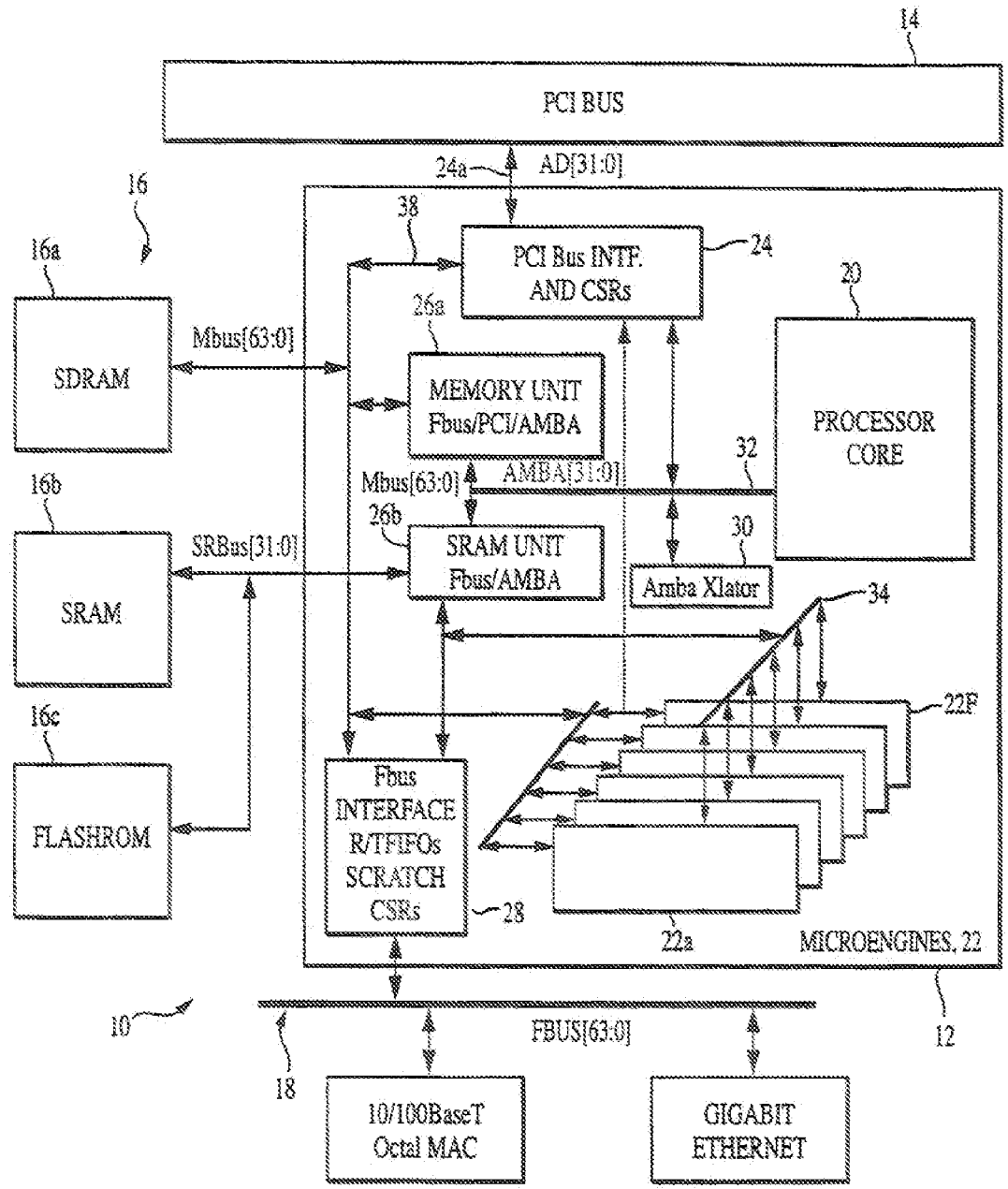
FIG. 1 is a block diagram of a communication system employing a processor.

Referring to FIG. 1, a communication system 10 includes a processor 12. In one embodiment, the processor is a hardware-based multithreaded processor 12. The processor 12 is coupled to a bus such as a PCI bus 14, a memory system 16 and a second bus 18. The system 10 is especially useful for tasks that can be broken into parallel sub-tasks or functions. Specifically hardware-based multithreaded processor 12 is useful for tasks that are bandwidth oriented rather than latency oriented. The hardware-based multithreaded processor 12 has multiple microengines 22 each with multiple hardware controlled threads that can be simultaneously active and independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a–22f. The processor 20 can use any supported operating system preferably a real time operating system. For the core processor implemented as a Strong Arm architecture, operating systems such as, MicrosoftNT® real time, VXWorks and μCUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually operating at any one time.

Microengines 22a–22f each have capabilities for processing four hardware threads. The microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in, e.g., networking packet processing, postscript processor, or as a processor for a storage subsystem, i.e., RAID disk storage, or for low latency, fast access tasks, e.g., accessing look-up tables, memory for the core processor 20, and so forth.

The processor 12 includes a bus interface 28 that couples the processor to the second bus 18. Bus interface 28 in one embodiment couples the processor 12 to the so-called FBUS 18 (FIFO bus). The processor 12 includes a second interface e.g., a PCI bus interface 24 that couples other system components that reside on the PCI 14 bus to the processor 12. The PCI bus interface 24, provides a high speed data path 24a to the SDRAM memory 16a. Through that path data can be moved quickly from the SDRAM 16a through the PCI bus 14, via direct memory access (DMA) transfers.

Each of the functional units are coupled to one or more internal buses. The internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controller 26a, 26c and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Figures 1, 2:
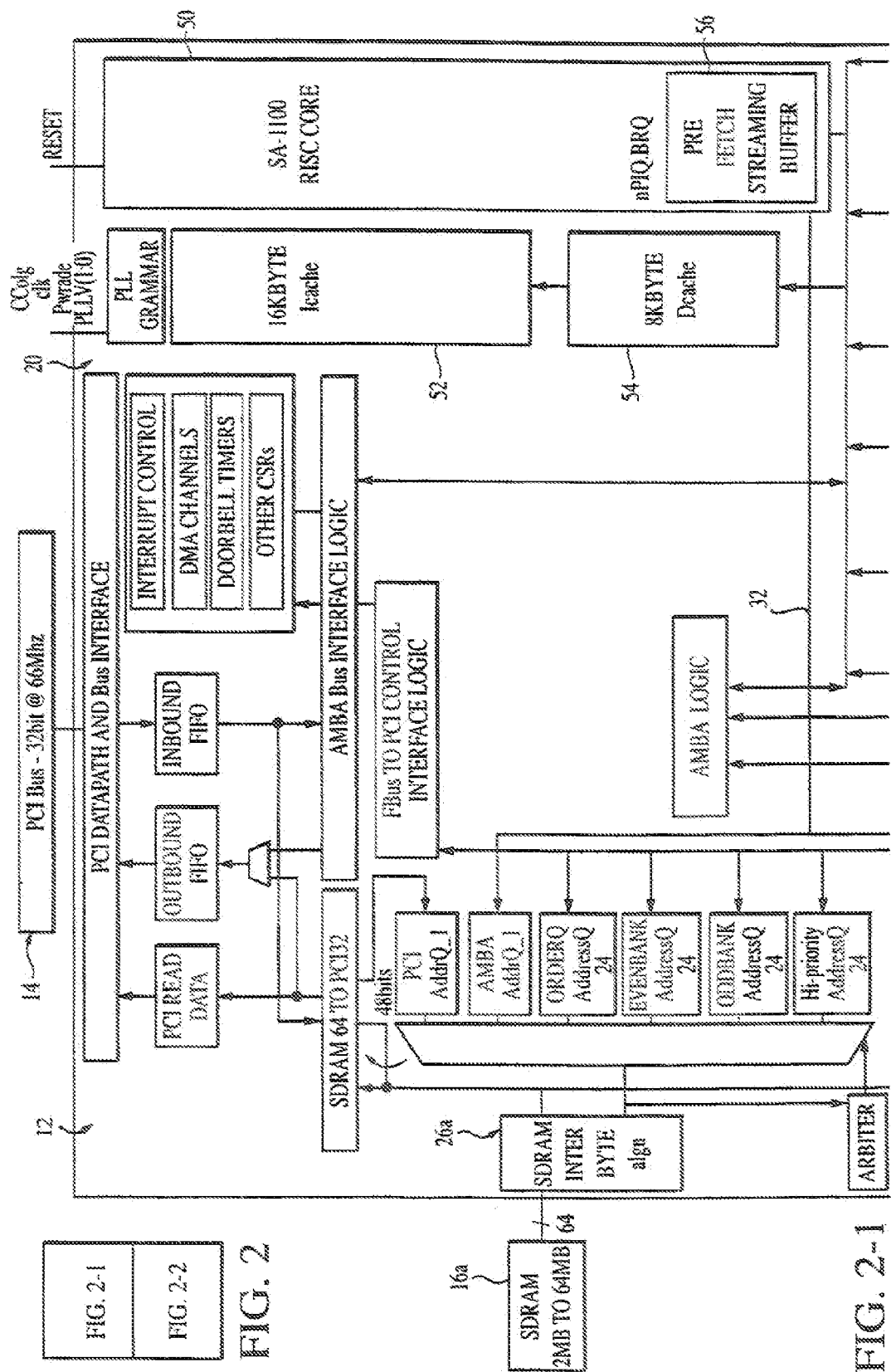
FIG. 2 is a detailed block diagram of the processor.
Figure 2:
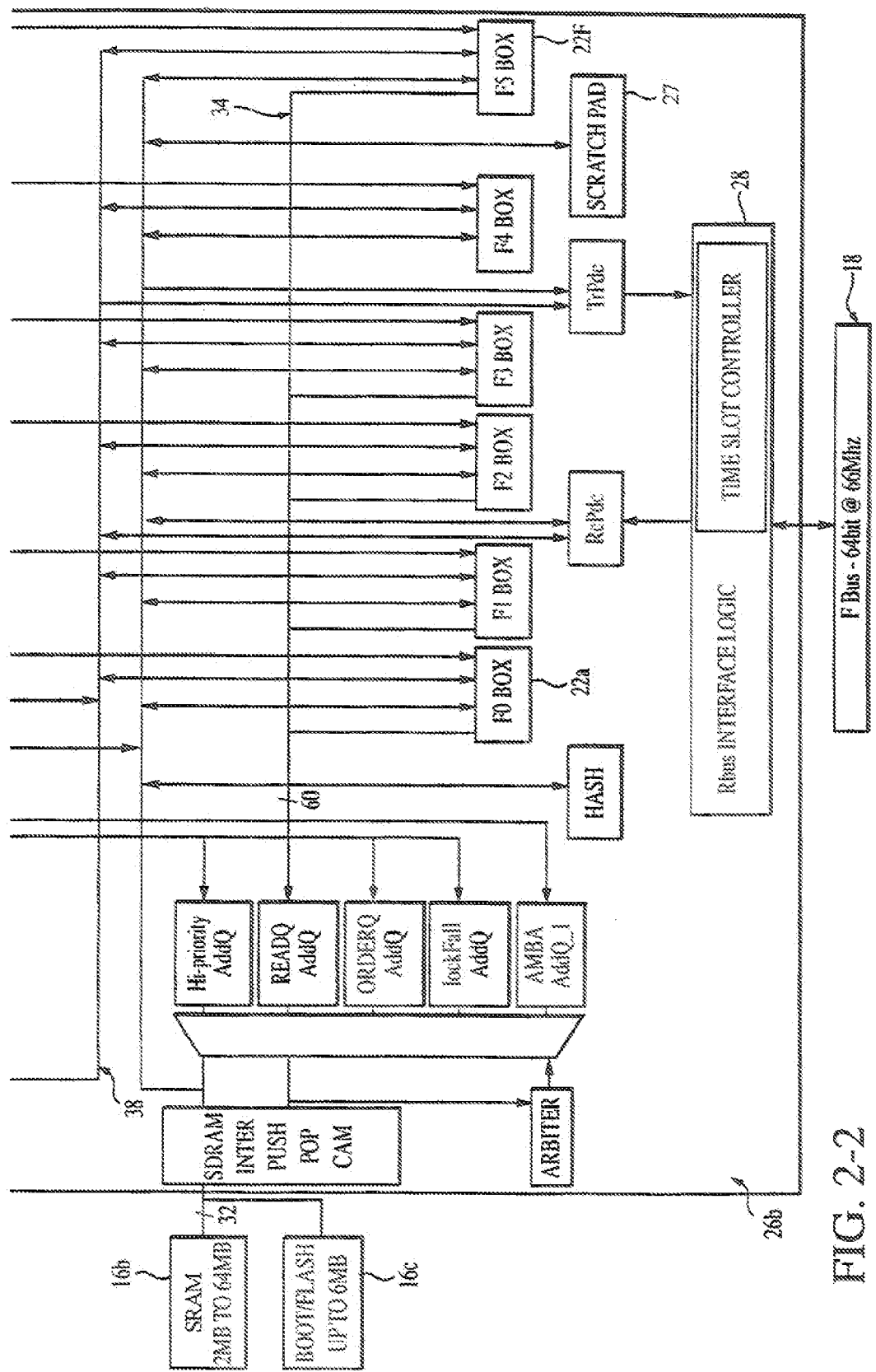

Referring to FIG. 2, each of the microengines 22a–22f includes an arbiter that examines flags to determine the available threads to be operated upon. Any thread from any of the microengines 22a–22f can access the SDRAM controller 26a, SDRAM controller 26b or FBUS interface 28. The memory controllers 26a and 26b each include a plurality of queues to store outstanding memory reference requests. The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM.

The core processor 20 accesses the shared resources. The core processor 20 has a direct communication to the SDRAM controller 26a to the bus interface 24 and to SRAM controller 26b via bus 32. However, to access the microengines 22a–22f and transfer registers located at any of the microengines 22a–22f, the core processor 20 access the microengines 22a–22f via the ASB Translator 30 over bus 34. The ASB translator 30 can physically reside in the FBUS interface 28, but logically is distinct. The ASB Translator 30 performs an address translation between FBUS microengine transfer register locations and core processor addresses (i.e., ASB bus) so that the core processor 20 can access registers belonging to the microengines 22a–22c.

Although microengines 22 can use the register set to exchange data as described below, a scratchpad memory 27 is also provided to permit microengines to write data out to the memory for other microengines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm® architecture but it is implemented with a five stage pipeline for performance reasons. The processor core 20 also includes a 16 kilobyte instruction cache 52, an 8 kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
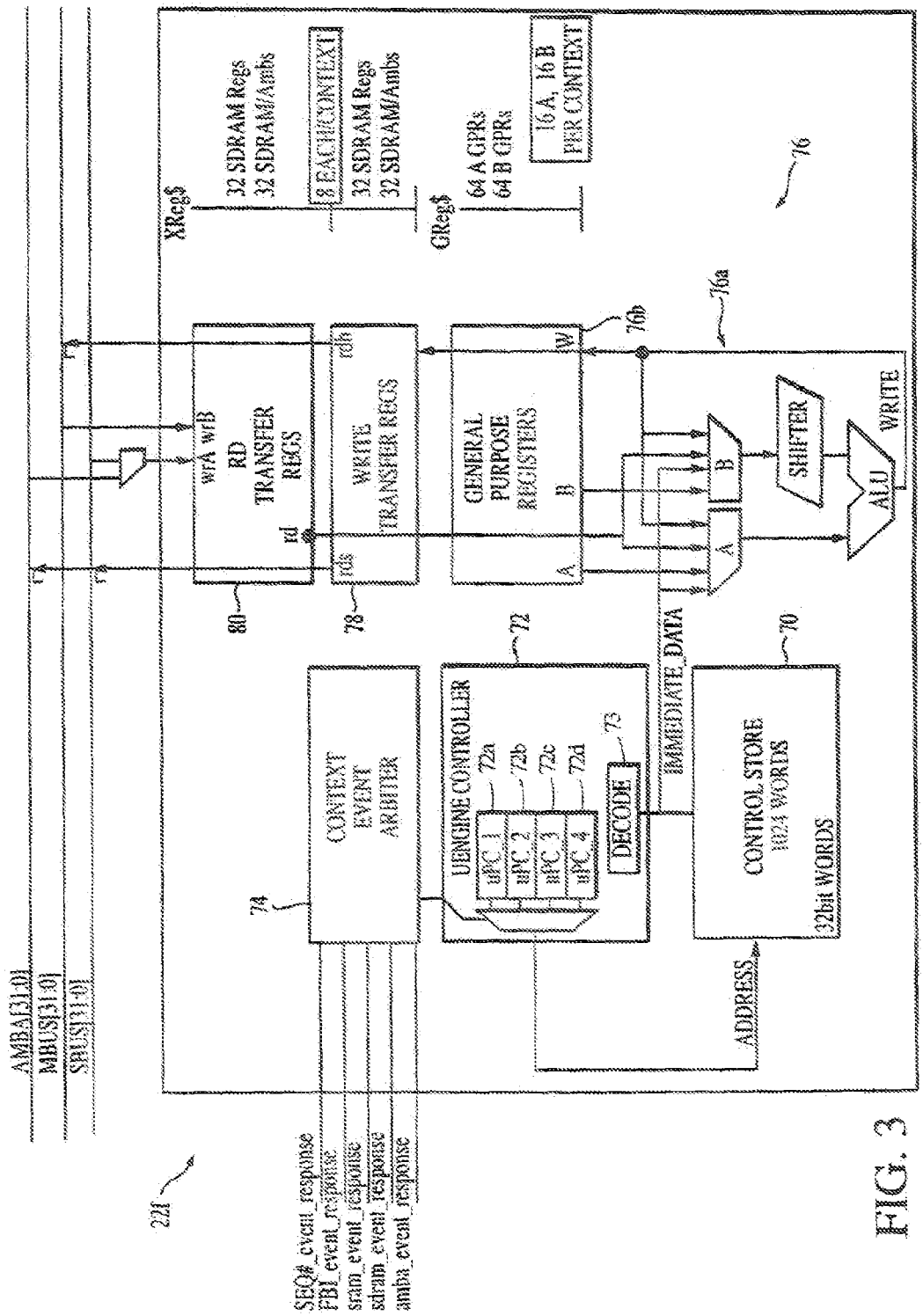
FIG. 3 is a block diagram of a microengine used in the processor of FIGS. 1 and 2.

Referring to FIG. 3, an exemplary microengine 22f includes a control store 70 that includes a RAM which stores a microprogram. The microprogram is loadable by the core processor 20. The microengine 22f also includes controller logic 72. The controller logic includes an instruction decoder 73 and program counter (PC) units 72a–72d. The four micro program counters 72a–72d are maintained in hardware. The microengine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The microengine 22f can have a maximum of e.g., 4 threads available.

In addition to event signals that are local to an executing thread, the microengines 22 employ signaling states that are global. With signaling states, an executing thread can broadcast a signal state to all microengines 22. Receive Request or Available signal, any and all threads in the microengines can branch on these signaling states. These signaling states can be used to determine availability of a resource or whether a resource is due for servicing.

The context event logic 74 has arbitration for the four (4) threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logical functions as well as shift functions. The arithmetic logic unit includes condition code bits that are used by instructions described below. The registers set 76b has a relatively large number of general purpose registers that are windowed as will be described so that they are relatively and absolutely addressable. The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the thread that the data is available or has been sent. Both transfer register banks 78 and 80 are connected to the execution box (EBOX) 76 through a data path.

Figure 4:
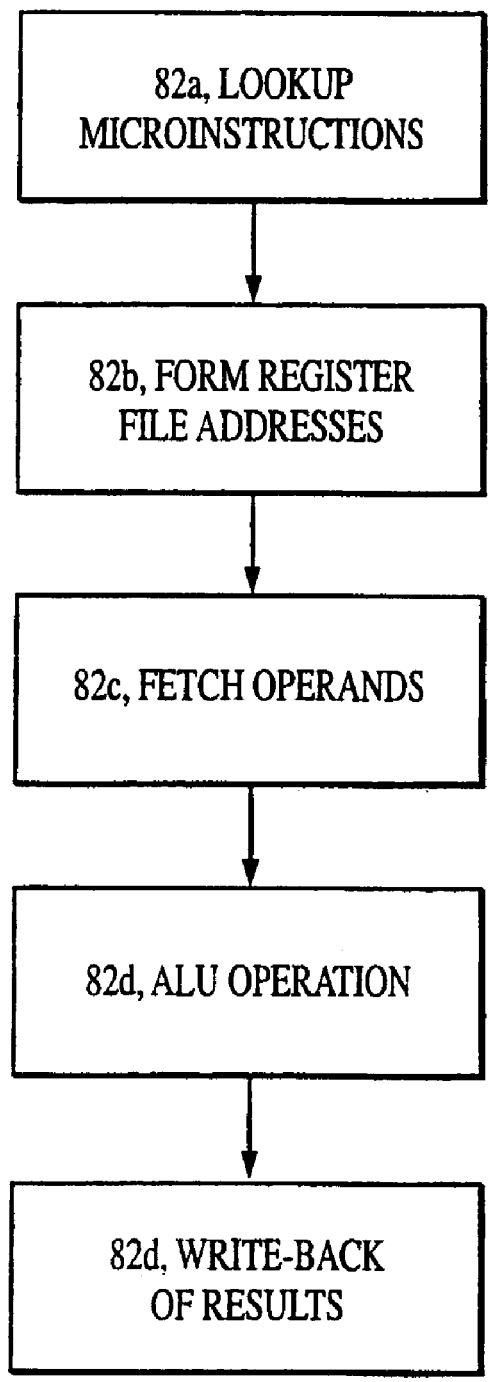
FIG. 4 is a diagram of a pipeline in the microengine.

Referring to FIG. 4, the microengine datapath maintains a 5-stage micro-pipeline 82. This pipeline includes lookup of microinstruction words 82a, formation of the register file addresses 82b, read of operands from register file 82c, ALU, shift or compare operations 82d, and write-back of results to registers 82e. By providing a write-back data bypass into the ALU/shifter units, and by assuming the registers are implemented as a register file (rather than a RAM), the microengine can perform a simultaneous register file read and write, which completely hides the write operation.

The instruction set supported in the microengines 22a–22f support conditional branches. The worst case conditional branch latency (not including jumps) occurs when the branch decision is a result of condition codes being set by the previous microcontrol instruction. The latency is shown below in Table 1:

TABLE 1

|  | 1 | 2 | 3 | 4 | 5 | 6 | 7 | 8 |
|---|---|---|---|---|---|---|---|---|
| microstore lookup | n1 | cb | n2 | XX | b1 | b2 | b3 | b4 |
| reg addr gen |  | n1 | cb | XX | XX | b1 | b2 | b3 |
| reg file lookup |  |  | n1 | cb | XX | XX | b1 | b2 |
| ALU/shifter/cc |  |  |  | n1 | cb | XX | XX | b1 |
| write back |  | m2 |  |  | n1 | cb | XX | XX | where nx is pre-branch microword (n1 sets cc's), cb is conditional branch, bx is post-branch microword and XX is an aborted microword As shown in Table 1, it is not until cycle 4 that the condition codes of n1 are set, and the branch decision can be made (which in this case causes the branch path to be looked up in cycle 5). The microengine 22f incurs a 2-cycle branch latency penalty because it must abort operations n2 and n3 (the 2 microwords directly after the branch) in the pipe, before the branch path begins to fill the pipe with operation b1. If the branch is not taken, no microwords are aborted and execution continues normally. The microengines have several mechanisms to reduce or eliminate the effective branch latency.

The microengines support selectable deferred branches. Selectable deferring branches are when a microengine allows 1 or 2 micro instructions after the branch to execute before the branch takes effect (i.e. the effect of the branch is "deferred" in time). Thus, if useful work can be found to fill the wasted cycles after the branch microword, then the branch latency can be hidden. A 1-cycle deferred branch is shown below in Table 2 where n2 is allowed to execute after cb, but before b1:

TABLE 2

|  | 1 | 2 | 3 | 4 | 5 | 6 | 7 | 8 |
|---|---|---|---|---|---|---|---|---|
| microstore lookup | n1 | cb | n2 | XX | b1 | b2 | b3 | b4 |
| reg addr gen |  | n1 | cb | n2 | XX | b1 | b2 | b3 |
| reg file lookup |  |  | n1 | cb | n2 | XX | b1 | b2 |
| ALU/shifter/cc |  |  |  | n1 | cb | n2 | XX | b1 |
| write back |  |  |  |  | n1 | cb | n2 | XX |

A 2-cycle deferred branch is shown in TABLE 3 where n2 and n3 are both allowed to complete before the branch to b1 occurs. Note that a 2-cycle branch deferment is only allowed when the condition codes are set on the microword preceding the branch.

TABLE 3

|  | 1 | 2 | 3 | 4 | 5 | 6 | 7 | 8 | 9 |
|---|---|---|---|---|---|---|---|---|---|
| microstore lookup | n1 | cb | n2 | n3 | b1 | b2 | b3 | b4 | b5 |
| reg addr gen |  | n1 | cb | n2 | n3 | b1 | b2 | b3 | b4 |
| reg file lkup |  |  | n1 | cb | n2 | n3 | b1 | b2 | b3 |
| ALU/shifter/cc |  |  |  | n1 | cb | n2 | n3 | b1 | b2 |
| write back |  |  |  |  | n1 | cb | n2 | n3 | b1 |

The microengines also support condition code evaluation. If the condition codes upon which a branch decision are made are set 2 or more microwords before the branch, then 1 cycle of branch latency can be eliminated because the branch decision can be made 1 cycle earlier as in Table 4.

TABLE 4

|  | 1 | 2 | 3 | 4 | 5 | 6 | 7 | 8 |
|---|---|---|---|---|---|---|---|---|
| microstore lookup | n1 | n2 | cb | XX | b1 | b2 | b3 | b4 |
| reg addr gen |  | n1 | n2 | cb | XX | b1 | b2 | b3 |
| reg file lookup |  |  | n1 | n2 | cb | XX | b1 | b2 |
| ALU/shifter/cc |  |  |  | n1 | n2 | cb | XX | b1 |
| write back |  |  |  |  | n1 | n2 | cb | XX |

In this example, n1 sets the condition codes and n2 does not set the conditions codes. Therefore, the branch decision can be made at cycle 4 (rather than 5), to eliminate 1 cycle of branch latency. In the example in Table 5 the 1-cycle branch deferment and early setting of condition codes are combined to completely hide the branch latency. That is, the condition codes (cc's) are set 2 cycles before a 1-cycle deferred branch.

TABLE 5

|  | 1 | 2 | 3 | 4 | 5 | 6 | 7 | 8 |
|---|---|---|---|---|---|---|---|---|
| microstore lookup | n1 | n2 | cb | n3 | b1 | b2 | b3 | b4 |
| reg addr gen |  | n1 | n2 | cb | n3 | b1 | b2 | b3 |
| reg file lookup |  |  | n1 | n2 | cb | n3 | b1 | b2 |
| ALU/shifter/cc |  |  |  | n1 | n2 | cb | n3 | b1 |
| write back |  |  |  |  | n1 | n2 | cb | n3 |

In the case where the condition codes cannot be set early (i.e. they are set in the microword preceding the branch), the microengine supports branch guessing which attempts to reduce the 1 cycle of exposed branch latency that remains. By "guessing" the branch path or the sequential path, the microsequencer pre-fetches the guessed path 1 cycle before it definitely knows what path to execute. If it guessed correctly, 1 cycle of branch latency is eliminated as shown in Table 6.

TABLE 6 guess branch taken/branch is taken

|  | 1 | 2 | 3 | 4 | 5 | 6 | 7 | 8 |
|---|---|---|---|---|---|---|---|---|
| microstore lookup | n1 | cb | n1 | b1 | b2 | b3 | b4 | b5 |
| reg addr gen |  | n1 | cb | XX | b1 | b2 | b3 | b4 |
| reg file lookup |  |  | n1 | cb | XX | b1 | b2 | b3 |
| ALU/shifter/cc |  |  |  | n1 | cb | XX | b1 | b2 |
| write back |  |  |  |  | n1 | cb | XX | b1 |

If the microcode guessed a branch taken incorrectly, the microengine still only wastes 1 cycle as in TABLE 7

TABLE 7 guess branch taken/branch is NOT taken

|  | 1 | 2 | 3 | 4 | 5 | 6 | 7 | 8 |
|---|---|---|---|---|---|---|---|---|
| microstore lookup | n1 | cb | n1 | XX | n2 | n3 | n4 | n5 |
| reg addr gen |  | n1 | cb | n1 | XX | n2 | n3 | n4 |
| reg file lookup |  |  | n1 | cb | n1 | XX | n2 | n3 |
| ALU/shifter/cc |  |  |  | n1 | cb | n1 | XX | n2 |
| write back |  |  |  |  | n1 | cb | n1 | XX |

However, the latency penalty is distributed differently when microcode guesses a branch is not taken. For guess branch NOT taken/branch is NOT taken there are no wasted cycles as in Table 8.

TABLE 8

|  | 1 | 2 | 3 | 4 | 5 | 6 | 7 | 8 |
|---|---|---|---|---|---|---|---|---|
| microstore lookup | n1 | cb | n1 | n2 | n3 | n4 | n5 | n6 |
| reg addr gen |  | n1 | cb | n1 | n2 | n3 | n4 | n5 |
| reg file lookup |  |  | n1 | cb | n1 | n2 | n1 | b4 |
| ALU/shifter/cc |  |  |  | n1 | cb | n1 | n2 | n3 |
| write back |  |  |  |  | n1 | cb | n1 | n2 |

However for guess branch NOT taken /branch is taken there are 2 wasted cycles as in Table 9.

TABLE 9

|  | 1 | 2 | 3 | 4 | 5 | 6 | 7 | 8 |
|---|---|---|---|---|---|---|---|---|
| microstore lookup | n1 | cb | n1 | XX | b1 | b2 | b3 | b4 |
| reg addr gen |  | n1 | cb | XX | XX | b1 | b2 | b3 |
| reg file lookup |  |  | n1 | cb | XX | XX | b1 | b2 |
| ALU/shifter/cc |  |  |  | n1 | cb | XX | XX | b1 |
| write back |  |  |  |  | n1 | cb | XX | XX |

The microengine can combine branch guessing with 1-cycle branch deferment to improve the result further. For guess branch taken with 1-cycle deferred branch/branch is taken is in Table 10.

TABLE 10

|  | 1 | 2 | 3 | 4 | 5 | 6 | 7 | 8 |
|---|---|---|---|---|---|---|---|---|
| microstore lookup | n1 | cb | n2 | b1 | b2 | b3 | b4 | b5 |
| reg addr gen |  | n1 | cb | n2 | b1 | b2 | b3 | b4 |
| reg file lookup |  |  | n1 | cb | n2 | b1 | b2 | b3 |
| ALU/shifter/cc |  |  |  | n1 | cb | n2 | b1 | b2 |
| write back |  |  |  |  | n1 | cb | n2 | b1 |

In the case above, the 2 cycles of branch latency are hidden by the execution of n2, and by correctly guessing the branch direction.

If microcode guesses incorrectly, 1 cycle of branch latency remains exposed as in Table 11 (guess branch taken with 1-cycle deferred branch/branch is NOT taken).

TABLE 11

|  | 1 | 2 | 3 | 4 | 5 | 6 | 7 | 8 | 9 |
|---|---|---|---|---|---|---|---|---|---|
| microstore lookup | n1 | cb | n2 | XX | n3 | n4 | n5 | n6 | n7 |

TABLE 11-continued

| | 1 | 2 | 3 | 4 | 5 | 6 | 7 | 8 | 9 |
|---|---|---|---|---|---|---|---|---|---|
| reg addr gen | | n1 | cb | n2 | XX | n3 | n4 | n5 | n6 |
| reg file lkup | | | n1 | cb | n2 | XX | n3 | n4 | n5 |
| ALU/shftr/cc | | | | n1 | cb | n2 | XX | n3 | n4 |
| write back | | | | | n1 | cb | n2 | XX | n3 |

If microcode correctly guesses a branch NOT taken, then the pipeline flows sequentially in the normal unperturbed case. If microcode incorrectly guesses branch NOT taken, the microengine again exposes 1 cycle of unproductive execution as shown in Table 12.

TABLE 12

| | guess branch NOT taken/branch is taken | | | | | | | | |
|---|---|---|---|---|---|---|---|---|---|
| | 1 | 2 | 3 | 4 | 5 | 6 | 7 | 8 | 9 |
| microstore lookup | n1 | cb | n2 | XX | b1 | b2 | b3 | b4 | b5 |
| reg addr gen | | n1 | cb | n2 | XX | b1 | b2 | b3 | b4 |
| reg file lkup | | | n1 | cb | n2 | XX | b1 | b2 | b3 |
| ALU/shftr/cc | | | | n1 | cb | n2 | XX | b1 | b2 |
| write back | | | | | n1 | cb | n2 | XX | b1 | where nx is pre-branch microword (n1 sets cc's)
cb is conditional branch
bx is post-branch microword
XX is aborted microword In the case of a jump instruction, 3 extra cycles of latency are incurred because the branch address is not known until the end of the cycle in which the jump is in the ALU stage (Table 13).

TABLE 13

| | 1 | 2 | 3 | 4 | 5 | 6 | 7 | 8 | 9 |
|---|---|---|---|---|---|---|---|---|---|
| microstore lookup | n1 | jp | XX | XX | XX | j1 | j2 | j3 | j4 |
| reg addr gen | | n1 | jp | XX | XX | XX | j1 | j2 | j3 |
| reg file lkup | | | n1 | jp | XX | XX | XX | j1 | j2 |
| ALU/shftr/cc | | | | n1 | jp | XX | XX | XX | j1 |
| write back | | | | | n1 | jp | XX | XX | XX |

Referring to FIG. 5, the microengines 22a–22f support various branch instructions such as those that branch on condition codes. In addition, the microengines also support branch instructions that branch on any specified bit being set or cleared. This class of branch instructions allows a programmer to specify which bit of a register to use as a branch control bit. The instruction format includes a bit_position field that specifies the bit position in a longword. Valid bit positions in this implementation are bits 0:31. The branch target is a label specified in the instruction.

Usually branch instruction requires that the processor shift bits into a control path where the processor has condition codes from an ALU and then performs the branch operation. This branch instruction allows observability of branch codes. Thus, rather than having the processor push the branch codes out into the control path the branches can be controlled from the data path of the processor.

BR_BCLR, BR_BSET are branch instructions that branch to an instruction at a specified label when a specified bit of a register specified by the instruction is cleared or set. These instructions set the condition codes.

Format: br_bclr[reg, bit_position, label#], optional_token
br_bset[reg, bit_position, label#], optional_token The field reg A is an address of a context-relative transfer register or general-purpose register that holds the operand. The field bit_position A is a number that specifies a bit position in a longword. Bit 0 is the least significant bit. Valid bit_position values are 0 through 31. The field label# is a symbolic label corresponding to the address of an instruction to branch to. The value optional_token can have several values. The value is selected by the programmer based on programming considerations. The tokens can be:

Defer 1 which execute the instruction following the branch instruction before performing the branch operation.

Defer 2 which executes two instructions following the branch instruction before performing the branch operation. (In some implementations this may not be allowed with guess_branch.)

Defer 3 which executes three instructions following the branch instruction before performing the branch operation. (In some implementations this may not be allowed with guess_branch.)

Another token can be "guess_branch" which causes the branch instruction to prefetche the instruction for the "branch taken" condition rather than the next sequential instruction. This token guess_branch can be used with the defer token, e.g., defer 1 to improve performance. In some architectures this might not be allowed with defer 2 or defer 3.

Figure 6:
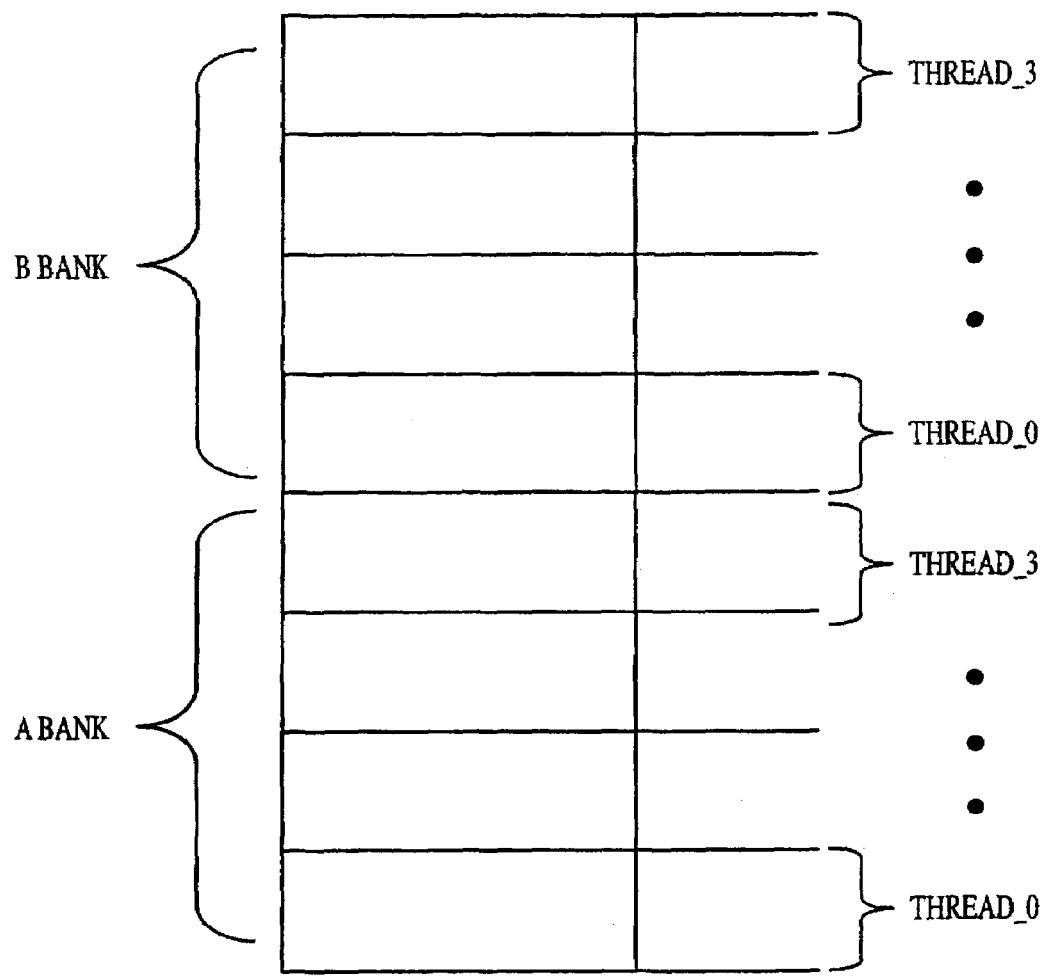
FIG. 6 is a block diagram of general purpose registers.

Referring to FIG. 6, the two register address spaces that exist are Locally accessibly registers, and Globally accessible registers accessible by all microengines. The General Purpose Registers (GPRs) are implemented as two separate banks (A bank and B bank) whose addresses are interleaved on a word-by-word basis such that A bank registers have lsb=0, and B bank registers have lsb=1. Each bank is capable of performing a simultaneous read and write to two different words within its bank.

Across banks A and B, the register set 76b is also organized into four windows $76b_0$–$76b_3$ of 32 registers that are relatively addressable per thread. Thus, thread_0 will find its register 0 at 77a (register 0), the thread_1 will find its register_0 at 77b (register 32), thread_2 will find its register_0 at 77c (register 64), and thread 3 at 77d (register 96). Relative addressing is supported so that multiple threads can use the exact same control store and locations but access different windows of register and perform different functions. The use of register window addressing and bank addressing provide the requisite read bandwidth while using only dual ported RAMS in the microengine 22f.

These windowed registers do not have to save data from context switch to context switch so that the normal push and pop of a context swap file or stack is eliminated. Context switching here has a 0 cycle overhead for changing from one context to another. Relative register addressing divides the register banks into windows across the address width of the general purpose register set. Relative addressing allows access any of the windows relative to the starting point of the window. Absolute addressing is also supported in this architecture where any one of the absolute registers may be accessed by any of the threads by providing the exact address of the register.

Addressing of general purpose registers 78 can occur in 2 modes depending on the microword format. The two modes are absolute and relative. In absolute mode, addressing of a register address is directly specified in 7-bit source field (a6–a0 or b6–b0), as shown in Table 14:

TABLE 14

|  | 7 | 6 | 5 | 4 | 3 | 2 | 1 | 0 |  |
|---|---|---|---|---|---|---|---|---|---|
| A GPR: | a6 | 0 | a5 | a4 | a3 | a2 | a1 | a0 | a6 = 0 |
| B GPR: | b6 | 1 | b5 | b4 | b3 | b2 | b1 | b0 | b6 = 0 |
| SRAM/ASB: | a6 | a5 | a4 | 0 | a3 | a2 | a1 | a0 | a6 = 1, a5 = 0, a4 = 0 |
| SDRAM: | a6 | a5 | a4 | 0 | a3 | a2 | a1 | a0 | a6 = 1, a5 = 0, a4 = 1 | register address directly specified in 8-bit dest field (d7–d0) Table 15:

TABLE 15

|  | 7 | 6 | 5 | 4 | 3 | 2 | 1 | 0 |  |
|---|---|---|---|---|---|---|---|---|---|
| A GPR: | d7 | d6 | d5 | d4 | d3 | d2 | d1 | d0 | d7 = 0, d6 = 0 |
| B GPR: | d7 | d6 | d5 | d4 | d3 | d2 | d1 | d0 | d7 = 0, d6 = 1 |
| SRAM/ASB: | d7 | d6 | d5 | d4 | d3 | d2 | d1 | d0 | d7 = 1, d6 = 0, d5 = 0 |
| SDRAM: | d7 | d6 | d5 | d4 | d3 | d2 | d1 | d0 | d7 = 1, d6 = 0, d5 = 1 |

If <a6:a5>=1,1, <b6:b5>=1,1, or <d7:d6>=1,1 then the lower bits are interpreted as a context-relative address field (described below). When a non-relative A or B source address is specified in the A, B absolute field, only the lower half of the SRAM/ASB and SDRAM address spaces can be addressed. Effectively, reading absolute SRAM/SDRAM devices has the effective address space; however, since this restriction does not apply to the dest field, writing the SRAM/SDRAM still uses the full address space.

In relative mode, addresses a specified address is offset within context space as defined by a 5-bit source field (a4–a0 or b4–b0) Table 16:

TABLE 16

|  | 7 | 6 | 5 | 4 | 3 | 2 | 1 | 0 |  |
|---|---|---|---|---|---|---|---|---|---|
| A GPR: | a4 | 0 | context | a3 | a2 | a1 | a0 | a4 = 0 |
| B GPR: | b4 | 1 | context | b3 | b2 | b1 | b0 | b4 = 0 |
| SRAM/ASB: | ab4 | 0 | ab3 | context | b2 | b1 | ab0 | ab4 = 1, ab3 = 0 |
| SDRAM: | ab4 | 0 | ab3 | context | b2 | b1 | ab0 | ab4 = 1, ab3 = 1 | or as defined by the 6-bit dest field (d5–d0) Table 17:

TABLE 17

|  | 7 | 6 | 5 | 4 | 3 | 2 | 1 | 0 |  |
|---|---|---|---|---|---|---|---|---|---|
| A GPR: | d5 | d4 | context | d3 | d2 | d1 | d0 | d5 = 0, d4 = 0 |
| B GPR: | d5 | d4 | context | d3 | d2 | d1 | d0 | d5 = 0, d4 = 1 |
| SRAM/ASB: | d5 | d4 | d3 | context | d2 | d1 | d0 | d5 = 1, d4 = 0, d3 = 0 |
| SDRAM: | d5 | d4 | d3 | context | d2 | d1 | d0 | d5 = 1, d4 = 0, d3 = 1 |

If <d5:d4>=1,1, then the destination address does not address a valid register, thus, no dest operand is written back.

Other embodiments are within the scope of the appended claims.

What is claimed is:

1. A computer program product residing on a computer readable storage medium comprising instructions, including a branch instructions that when executed on a computing device causes the computing device to:
    cause an instruction stream to branch to another instruction in the instruction stream based on a bit of a register being set or cleared, the branch instruction specifying the register and the bit of the register to use as a branch control bit, with the branch instruction including a token that is set by a programmer and specifies a number i of the instructions to execute following the branch instruction before performing the branch operation.

2. The computer program product of claim 1, wherein the branch instruction comprises
    a bit position field that specifies the bit position of the branch control bit in a longword contained in a register.

3. The computer program product of claim 1, wherein the branch instruction comprises
    a branch target field specified as a label in the instruction.

4. The computer program product of claim 1, wherein the number i of instructions can be specified as one, two or three.

5. The computer program product of claim 1 wherein the register is a context-relative transfer register or a general-purpose register that holds the operand.

6. The computer program product of claim 1 wherein the branch instruction allows a programmer to select which bit of the register to use to determine the branch operation.

7. The computer program product of claim 1 wherein the branch instruction allows branches to occur based on evaluation of a bit that is in a data path of a processor.

8. A method of operating a processor comprising:
    evaluating a bit of a register designated to use as a branch control bit, the bit of the register and the register being specified in a branch instruction;
    executing a number i of instructions following execution of the branch instruction before performing the branch operation based on evaluating a token that is set by a programmer; and
    performing a branching operation based on the specified bit of the specified register being set or cleared.

9. The method of claim 8 wherein the specified bit position is in a longword contained in a register.

10. The method of claim 8 further comprising:
    branching to another instruction at a branch target field specified as a label in the instruction.

11. The method of claim 8 wherein the specified bit is specified by a programmer.

12. The method of claim 8 wherein the register is a context-relative transfer register or a general-purpose register that holds the operand.

13. The method of claim 8 wherein the instruction allows a programmer to select which bit of the specified register to use to determine the branch operation.

14. The method of claim 8 wherein branch evaluation occurs based on evaluation of bits that are in a data path of the processor.

15. A processor comprising:
    a register stack;
    an arithmetic logic unit coupled to the register stack and a programmer control store that stores a branch instruction that causes the processor to:

evaluate a bit of one of the registers of the register stack, the bit designated to use as a branch control bit, the bit and the one of the registers of the stack being specified in the branch instruction;

execute a number i of instructions following execution of the branch instruction before performing the branch operation based on evaluating a token that is set by a programmer; and perform a branching operation specified by the branch instruction based on the bit of the register being set or cleared.

16. The processor of claim 15 wherein the specified bit is in a longword in a general purpose register.

17. The processor of claim 15, wherein the branch instruction comprises
a branch target field specified as a label in the branch instruction.

18. The processor of claim 15 wherein the specified bit is specified by a programmer.

19. The processor of claim 15 wherein the one of the registers is a context-relative transfer register or a general-purpose register that holds an operand.

20. A computer program product residing on a computer readable storage medium comprising instructions, including a branch instruction that when executed on a computing device causes the computing device to:
cause an instruction stream to branch to another instruction in the instruction stream based on a bit of a register set or cleared, the branch instruction specifying the register and the bit of the register to use as a branch control bit, with the branch instruction including a token that is set by a programmer and which specifies a guess branch prefetch for the instruction for the "branch taken" condition rather than the next sequential instruction.

21. The computer program product of claim 20, Wherein the branch instruction comprises a bit position field that specifics the bit position of the branch control bit in a longword contained in a register.

22. The computer program product of claim 20, wherein the branch instruction comprises a branch target field specified as a label in the instruction.

23. The computer program product of claim 1 wherein the branch instruction allows a programmer to select which bit of the register to use to determine the branch operation.

24. The computer program product of claim 1 wherein the branch instruction allows branches to occur based on evaluation of a bit that is in a data path of a processor.

25. A method of operating a processor comprising:
evaluating a bit of a register designated to use as a branch control bit, the bit of the register and the register being specified in a branch instruction;

prefetching a "branch taken" instruction based on a token that is set by a programmer, and which specifies a guess branch prefetch for the instruction for the "branch taken" condition rather than the next sequential instruction; and performing a branching operation based on the specified bit of the specified register being set or cleared.

26. The method of claim 25 wherein the specified bit position is a longword contained in a register.

27. The method of claim 25 further comprising:
branching to another instruction at a branch target field specified as a label in the instruction.

28. The method of claim 25 wherein the specified bit is specified by a programmer.

29. The method of claim 25 wherein branch evaluation occurs based on evaluation of bits that are in a data path of the processor.

30. A processor comprising:
a register stack;
an arithmetic logic unit coupled to the register stack and a program control store that stores a branch instruction that causes the processor to:
evaluate a bit of one of the registers of the register stack, the bit designated to use as a branch control hit, the bit and the one of the registers of the stack being specified in the branch instruction;

prefetch a "branch taken" instruction based on a token that is set by a programmer, and which specifies a guess branch prefetch for the instruction for the "branch taken" condition rather than the next sequential instruction; and perform a branching operation specified by the branch instruction based on the bit of the register being set or cleared.

31. The processor of claim 30 wherein the branch instruction comprises a branch target field specified as a label in the branch instruction.

* * * * *